May 9, 1950 J. W. SPENCER 2,507,323

PHOTOTELEGRAPHY SYSTEM

Filed Feb. 14, 1947 2 Sheets-Sheet 1

John William Spencer by

Peck & Peck

May 9, 1950 J. W. SPENCER 2,507,323

PHOTOTELEGRAPHY SYSTEM

Filed Feb. 14, 1947 2 Sheets-Sheet 2

John William Spencer by Peck & Peck

UNITED STATES PATENT OFFICE 2,507,323

PHOTOTELEGRAPHY SYSTEM

John William Spencer, Brooklands, Sale, England

Application February 14, 1947, Serial No. 728,625
In Great Britain February 18, 1946

2 Claims. (Cl. 178—7.4)

Figure 1:
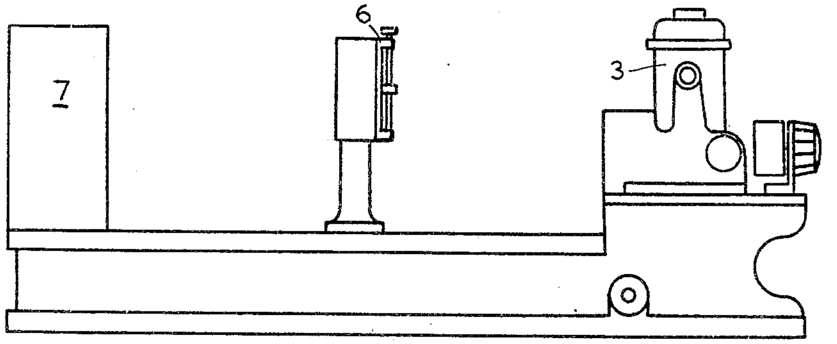

This invention relates to photo-telegraphy systems in which a subject evidencing variations of light and shade is moved relative to scanning means comprising an optical system and electrical apparatus in order to convert these variations into a succession of correspondingly varying electric impulses which are transmitted to a distant receiver there to vary the position of a light beam in relation to an aperture, the amount of light transmitted through the aperture varying, either directly or inversely, with the lightness in colour of the portion of the subject being scanned at any instant. The transmitted light is generally employed to influence a photographically sensitized surface through an optical system which "scans" the said surface in the same way as the means at the transmitter scans the subject.

Such systems are known and have been used extensively, with excellent results, for the photo-telegraphy of continuous-tone subjects, such as photographic (or photo-gravure) reproductions of scenes, portraits and the like.

When employed for the photo-telegraphy of "line" subjects containing fine detail, however, the results, though good, leave much to be desired and the reproductions obtained at the receiver are unsuitable, in particular, for the production by ordinary process engraving methods of a printing block of good quality from which further copies of the subject may be obtained. This disadvantage is particularly troublesome in newspaper work, as will be appreciated, and in this connection it may be stated that the term "line subjects" is to be interpreted herein as extending to subjects composed of a multiplicity of dots, such as reproductions from half-tone blocks.

The defects in the reproduction of the subject obtained at the receiver are due to the facts: (1) that the scanning means transmits an impulse equivalent to a grey whenever the portion of the subject being scanned at any instant includes both a black area and a white area, the depth of the grey tone depending upon the relative proportions of the black and white areas; (2) that the light beam of the receiver is adjusted so that it fills its associated aperture completely when deflected by an impulse equivalent to black and misses the aperture completely when deflected by an impulse equivalent to white, or vice versa; and (3) that the reception of an impulse equivalent to a grey tone causes partial illumination of the aperture with the consequent production of the same grey tone in the reproduction of the subject over an area thereof equivalent to the full width of the area then being scanned.

It will be clear, without further explanation, that a subject which is composed of sharply defined black and white areas will be reproduced with black and white areas merging into each other through grey tones at their edges. This effect becomes the more pronounced as the black areas are reduced in width and when letterpress is being transmitted, for example, there is a tendency for the black lines to be reproduced in greater than normal thickness but in varying tones of grey. When the lines are of widths approximating to the width of the area being scanned, those lines disposed substantially at right angles to the scanning direction may be reproduced at three times their correct width and those lines disposed substantially parallel with the said direction may be reproduced at twice their correct width. Moreover, there is no uniformity in reproduction because the degree to which the scanning track registers with the line concerned, at each traverse of the line, determines the thickness at which it is reproduced. Loss of definition in the reproduction necessarily occurs and, owing to the relatively large proportion of the area which is covered with grey tones, it is unsuitable for use in the preparation of a printing block of good quality by process engraving.

The chief object of the present invention is to provide improvements in photo-telegraphy systems of the character indicated which shall make it possible to avoid the disadvantages mentioned. Other objects are to utilise these improvements in novel applications and to provide improved means for use in putting the said improvements into practice.

A photo-telegraphy system in accordance with the present invention, broadly stated, is characterised by the provision of means which causes any electric impulse that is equivalent to a grey tone to become effective at the receiver in reproducing either a black or a white, as the case may be, such means being purely physical, i. e. all the electric impulses generated in the scanning means are transmitted to the receiver where the light beam with its associated aperture are so dimensioned and disposed in relation to each other that displacements of the one relative to the other for all grey tones of a deeper hue than a selected tone would produce the same result as a displacement due to a black.

In the following example of one way in which the invention may be carried into effect the scanning means and transmitter are of a known character.

Figure 2:
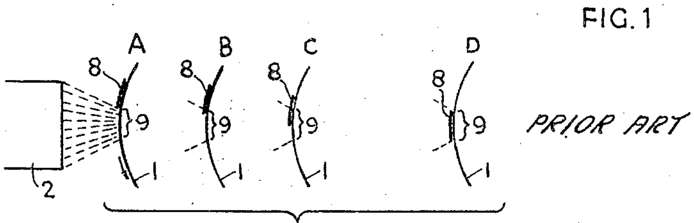
Figure 3:
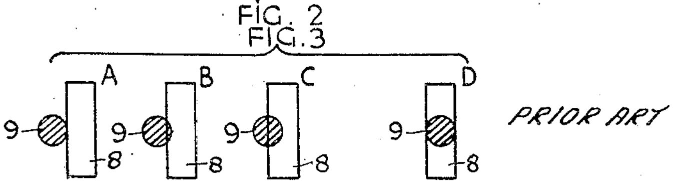
Figure 4:
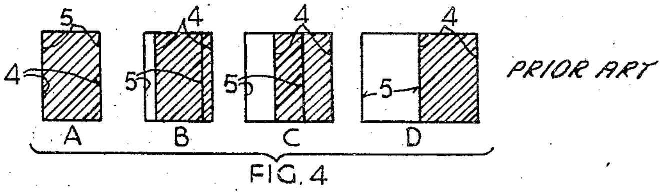

In the accompanying drawings:

Fig. 1 is a somewhat diagrammatic illustration, in side elevation, of so much of the receiver apparatus as is necessary to a proper understanding of the invention, Fig. 2 is a diagram, in side elevation, showing four stages in the passage past the scanning means at the transmitting location of a black line on a white ground on the subject, Fig. 3 is a diagram, in front elevation, illustrating the same four stages with the black line represented as an open rectangle and the scanning area represented as a shaded circle, Fig. 4 is a diagram, in front elevation, illustrating effects produced at the receiving location, with the known arrangements of apparatus, by the transmission of electric impulses corresponding to the respective scanning stages of Fig. 3.

Figure 5:
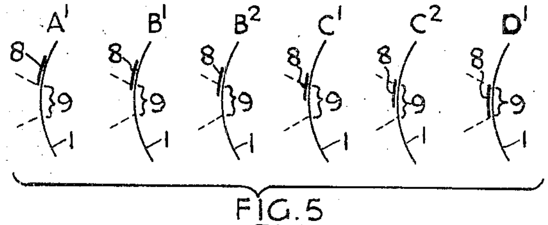
Figure 6:
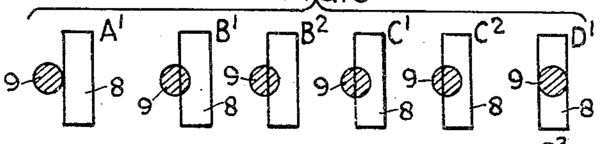
Figure 7:
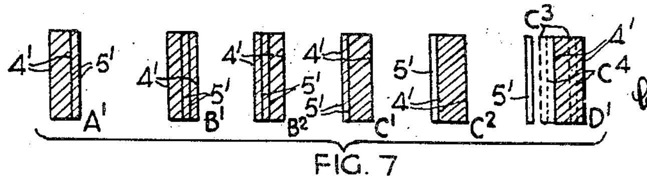
Figure 8:
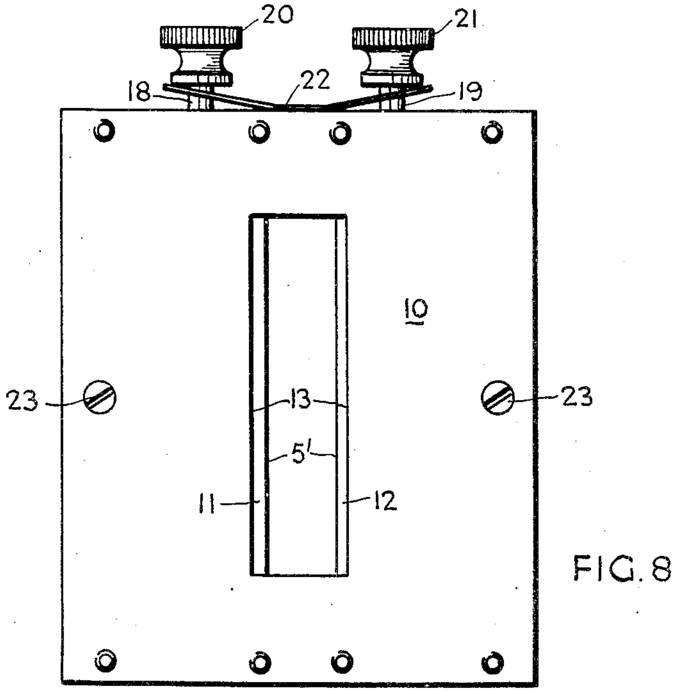
Figures 9, 10:
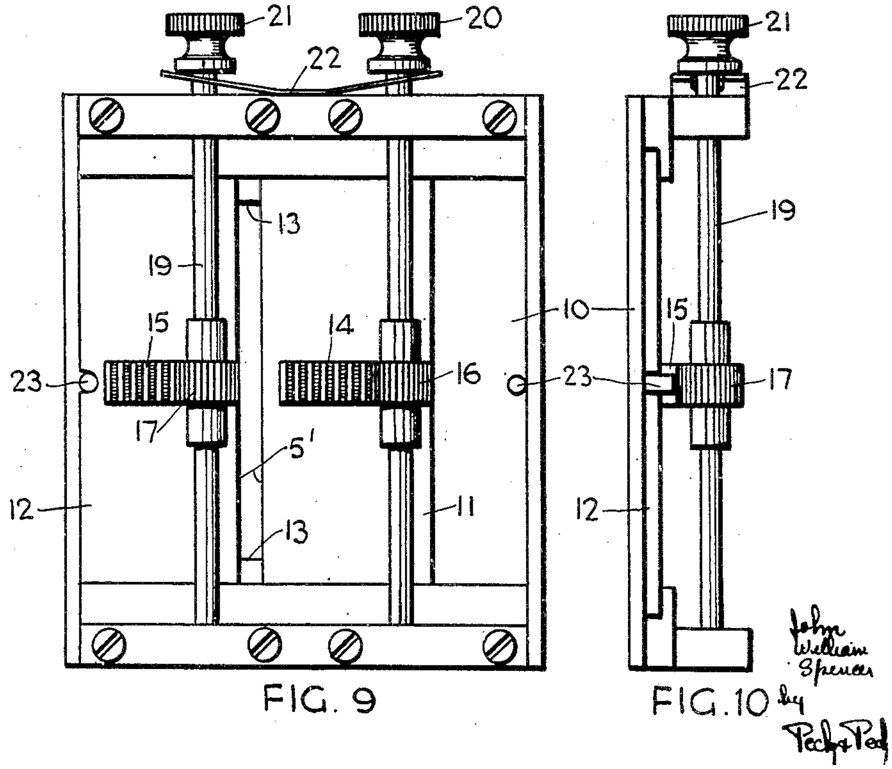

Fig. 5 is a diagram corresponding to Fig. 2 but showing six stages in the passage of the black line on the subject past the scanning means, Fig. 6 is a diagram corresponding to Fig. 3 but showing the six stages of Fig. 5, Fig. 7 is a diagram corresponding to Fig. 4 but illustrating the effects produced at the receiving location, with the aid of the improvements of the present invention, by the transmission of electric impulses corresponding to the respective scanning stages of Fig. 6, Fig. 8 is a detail view, to a larger scale and in rear elevation, of one suitable mask construction for use in carrying the present invention into effect, Fig. 9 is a front elevation of the mask showing a different position of adjustment of the shutters embodied therein, and Fig. 10 is a side elevation taken from the left of Fig. 9.

The particular type of photo-telegraphy system which is concerned in this example comprises a cylindrical support 1 (Fig. 2) for the subject, say a sheet of letterpress, arranged to rotate in the direction indicated by the arrow in Fig. 2 before a scanning objective 2 while being traversed axially. The area of the subject disposed opposite the objective 2 is strongly illuminated and an enlarged image thereof is projected on to a focussing screen (not shown) in the centre of which is a masking aperture restricting the scanned area to the desired size. A revolving slotted disc (also not shown) interposed between the masking aperture and a photoelectric cell assembly (not indicated) interrupts the light passing to the latter at a relatively high frequency so that the output from the cell assembly is an alternating current. The scanned area or strip may be $^1/_{135}$ of an inch in width and the arrangement is such, as is well-known, that the whole area of the subject is eventually traversed past the objective. The light pulses allowed to pass by the slots in the disc vary in intensity with the depth of tone of the respective strips of the subject and influence the photo-electric cell, which may be of the caesium vacuum type, to cause the transmission of correspondingly varying electric impulses, amplified as may be necessary, to the receiving station. At this station the electric impulses are eventually fed to an oscillograph 3 (Fig. 1) to cause the mirror thereof (not indicated) to oscillate to a greater of lesser degree in accordance with the variations in the impulses received.

In the normal arrangement of such apparatus, the beam of light reflected from the mirror of the oscillograph 3, represented by a shaded rectangle 4 in Fig. 4, is of approximately the same cross-sectional area as a slot 5, represented by an open rectangle in Fig. 4, cut in a mask 6 (Fig. 1) placed between the mirror and an optical system which concentrates any light passing through the slot on to a strip of a photographically sensitized surface carried on a cylindrical support (not shown) within a casing 7 (Fig. 1). The strip area is of the same dimensions as the strips in which the subject is scanned and the support is rotated and traversed axially at the same rate as the one carrying the subject at the transmitting end. However, the relative dimensions of the scanned areas at the transmitting and receiving ends may be increased or decreased provided that a corresponding increase or decrease be produced in the speed at which the cylindrical supports are traversed axially in relation to each other. In order to get the desired result, the apparatus as heretofore employed has been such that the beam of light is arranged to coincide with the slot when deflected by an impulse corresponding to a black strip of the subject (assuming a positive reproduction is to be made) and to be just clear of the slot when deflected by an impulse corresponding to a white strip of the subject. For a negative reproduction these conditions are reversed. The slot is thus of a width approximating to the range of travel of the light beam between black and white and the beam is of the same width as the slot.

Figs. 2 to 4 illustrate stages in the operation of the known arrangement as employed for producing a negative reproduction. In these figures, 8 represents a black line on a white ground on the subject carried on the support 1, the line being of a width approximately equal to that of the area 9 scanned at any instant by the objective 2 and the line extending at right angles to the direction in which it is advanced beneath the objective. Stage A, shown at the extreme left of Figs. 2 and 3, is that in which the leading edge of the line 8 is about to pass into the area 9. The impulse transmitted to the receiving apparatus is therefore one corresponding to pure white and the light beam 4 is deflected to coincide with the slot 5, see A of Fig. 4, to cause maximum illumination of the corresponding area of the sensitized surface on which the negative reproduction is to be made.

At stage B, the line 8 is partly within the scanned area 9 and, as the objective 2 always collects the total light reflected from this area, the impulse transmitted to the receiving apparatus corresponds to a light grey tone. Consequently, the light beam 4 swings partly off the slot 5 (see Fig. 4) with the result that the illumination of the sensitized surface is reduced somewhat and a positive reproduction made therefrom by normal photographic methods would show a light grey tone at the corresponding location.

Stage C shows the line 8 with half its width in the scanned area 9. The impulse transmitted corresponds to a mid-grey tone and the light beam 4 swings half off the slot 5 (Fig. 4). The illumination of the sensitized surface is correspondingly reduced so that a positive reproduction made therefrom would show a mid-grey tone at the corresponding location.

At stage D, the full width of the line 8 is in the scanned area 9 and the impulse transmitted is therefore one corresponding to full black. In consequence, the light beam 4 swings to a position just clear of the slot 5, see D of Fig. 4, and the sensitized surface receives no illumination.

It will be understood that, as the support 1 continues in its rotation, the sequence just described under stages A, B and C is repeated in reverse order during the passage of the trailing edge of the line 8 across the scanned area 9. The final result, therefore, is that a positive reproduction made by normal photographic methods from the negative obtained at the receiving location will show the line 8 at approximately three times its actual width but continuously varying in tone from one edge to the other through light grey, mid-grey, black, mid-grey and light grey. Similar effects are produced where the line to be transmitted runs parallel with the direction of scanning and also where dots or the like are to be transmitted.

Now, according to the present invention, the difficulties referred to are overcome by making the beam of light reflected from the mirror of the oscillograph 3 wider than the slot which itself is made narrower than usual. For example, the slot may be of a width corresponding to a predetermined fraction of the full range of travel of the light beam between positions thereof corresponding to transmission of black and transmission of white. Suitably, this fraction is one-eighth. The light beam is then made of a width which is a multiple of the slot-width and in one practical example it may be four times this width.

Figs. 5 to 7 illustrate the application of this example of the invention in the same manner as Figs. 2 to 4 illustrate the employment of the hitherto known arrangement. As before, the transmission of a black line 8 on a white ground is considered, the line extending transversely of the direction of scanning and being of a width approximately equal to that of the scanned area 9. The stages A, B, C and D of Figs. 2 to 4 are shown at A', B', C' and D' in Figs. 5 to 7 and two additional intermediate stages are also shown in Figs. 5 to 7, one $B^2$, coming between stages B' and C' and the other, $C^2$, coming between stages C' and D'. The stages B', $B^2$, C' and $C^2$ are selected to correspond with successive increases, by uniform steps, in the depth of the grey tones equivalent to the respective partial dispositions of the line 8 within the scanned area 9. Between the stages $C^2$ and D', however, is an interval corresponding to three such increases.

In Fig. 7 the light beam is indicated at 4' and the slot at 5' and the width of the beam is made four times the width of the slot which is itself made of a width equal to one-eighth of the full range of travel of the beam between positions corresponding to transmission of white (see stage A' in Fig. 7) and transmission of black (see stage D' in Fig. 7).

At stage A' the leading edge of the beam 4' (considered in the direction in which it moves for a change from white to a grey) coincides with the corresponding edge of the slot 5' and there is maximum illumination of the sensitized surface on which the negative reproduction is to be produced.

At each of stages B', $B^2$ and C', the impulse transmitted corresponds to a grey tone and the beam 4' swings across the slot 5' accordingly but still fully illuminates the latter. Consequently, a positive reproduction (made by normal photographic methods) from the negative obtained at the receiving location would show white at locations corresponding to any of stages A' to C'.

However, at stage C' the trailing edge of the beam 4' is coincident with the corresponding edge of the slot 5' so that the further movement of the beam produced when the scanning of the line 8 reaches the stage $C^2$ causes the beam to swing off the slot 5' to bring its trailing edge into coincidence with the opposite edge of the slot, as shown at $C^2$ in Fig. 7.

The further progression of the scanning up to the stage represented at D' in Figs. 5 and 6 causes the beam 4' to swing farther away from the slot 5' (see D' in Fig. 7) until the maximum displacement is reached corresponding to the transmission of full black.

It will be noted, however, that for stage $C^2$ and all the subsequent stages up to and including stage D', the slot 5' receives no illumination and, consequently, a positive reproduction from the negative obtained at the receiving location would show full black at the locations corresponding to the scanning stages $C^2$ to D'.

The stages A' to D' are naturally repeated in the inverse order as the line 8 passes out of the scanned area 9 but, again, there is a sudden change from full black to full white as the stage C' is reached.

In Fig. 7 at stage D' there are indicated by broken lines two intermediate positions ($C^3$ and $C^4$) of the beam 4' each corresponding to an increase in the depth of the grey tone transmitted by one-eighth of the full range from white to black (as compared with the preceding positions $C^2$ and $C^3$, respectively).

The setting up of the apparatus, in the example chosen, is effected by adjusting the oscillograph 3 and/or the position of the slot 5' in relation to the travel of the light beam 4' until the trailing edge of the light beam coincides with the corresponding edge of the slot when the beam is deflected by the transmission of the selected grey tone that is intended to be the deepest shade of grey to be reproduced as black (for a negative reproduction). For a positive reproduction, the adjustment is such that the leading edge of the beam lies just off the slot for the deepest grey to be reproduced as white, as will be understood.

In the operation of the apparatus for producing a negative reproduction, therefore, all electric impulses transmitted which are equivalent to white and to shades of grey up to and including the selected grey tone will produce deflections of the light beam 4' which are sufficient to cause it fully to illuminate the slot 5'. All the other electric impulses transmitted, which are equivalent naturally to black and to shades of grey down to but not including the selected grey tone, will produce deflections of the light beam away from the slot so that the latter will receive no illumination. It follows that the reproduction is composed substantially entirely of white and black areas. Similarly, when producing a positive reproduction, all the impulses equivalent to white and shades of grey up to and including the selected grey tone will produce deflections of the light beam which are insufficient to cause it to illuminate the slot. All the other impulses, however, will produce deflections of the light beam which are sufficient to illuminate the slot substantially completely. The reproduction is then composed substantially entirely of black and white areas.

Since the change from no illumination of the slot to complete illumination thereof corresponds to a change in the depth of the grey shade transmitted equivalent to about one-eighth of the full range from white to black, it will be seen that there is very little likelihood of a grey tone being reproduced. The risk of this occurring may be still further reduced by selecting the width of the slot 5' as a still smaller fraction of the full range of travel of the light beam 4', the only limitation being the amount of light required for satisfactory exposure of the sensitized surface.

A convenient method of adjusting or setting up the apparatus is to prepare a tone chart presenting, say, eight evenly spaced shades ranging from white to black and each applied to a separate area of the chart, and then to rotate or displace these areas before the scanning means 2 (Fig. 2) at the transmitting end while the successive steps in the swing of the light beam 4' (Fig. 7) at the receiving end are being noted. The slot 5' is then adjusted to be of a width equal to one of these steps (see Fig. 7) while the light beam is adjusted to be of a width equal to, say, four of these steps, and is suitably set (for negative reproduction) so that its trailing edge is coincident with the corresponding edge of the slot when the fourth shade is located before the scanning means, see stage C' in Fig. 7. With this example, all shades from one to four will produce full exposure of the sensitized surface and all shades from five to eight will produce no exposure thereof. In effect, therefore, a full black would be reproduced, as a black line on a white ground was being scanned, until the scanning area included approximately equal areas of white and black, whereupon a pure white would be reproduced (all for a negative reproduction). The error now is limited to half the width of the scanning track at each side of the line and a line of a width equal to that of the scanning track and disposed at right angles thereto might be reproduced at double thickness. It, would, however, appear as a clean cut black line in the positive reproduction.

As has been mentioned, the position of the slot 5' with relation to the range of travel of the light beam 4' may be altered, and by the adoption of this expedient a thicker or a thinner reproduction of the line concerned may be obtained, dependent upon whether the stage at which the varying shades of grey produce the change from non-illumination to full illumination of the slot is advanced or retarded, thus altering the point of change from effective white to effective black (or vice versa). The width of the beam would of course be adjusted to the correct multiple of the slot width in order to ensure full covering of the slot by the beam for all tones for which full illumination is required. Suitable selection of this characteristic will make it possible to reproduce, eliminate or emphasize such items of fine detail as "sky" dots in a print from a half-tone block. Similarly, subjects lacking in contrast, for example, consisting of only slightly different tones without white or black, may be reproduced in strongly contrasted black and white. The surface texture of materials such as paper may be reproduced in this fashion by utilising the minute shadow variations produced on their surfaces by the illuminant at the scanning location. It will be understood that the "distant" receiver may be relatively close to the transmitter for such applications of the invention.

A suitable practical construction of the mask in which the slot 5' is to be formed is illustrated in Figs. 8 to 10. It comprises an apertured support 10 having two slidably mounted shutters 11 and 12 thereon and provided with adjusting means whereby the shutters may be moved over the aperture 13 in the support to define between their adjacent edges a slot 5' of the required width. The position of this slot across the width of the aperture 13 may also be adjusted by similar movement of the shutters 11 and 12.

The adjusting means illustrated comprises a rack 14 or 15 secured on the respective shutter 11 or 12 and engaged by a pinion 16 (or 17) secured on a spindle 18 (or 19) journalled in the support 10 and operable by a knurled head 20 (or 21) also secured on the respective spindle. A leaf spring 22 provides a frictional lock for the spindle 18, 19 and stop pins 23 (Figs. 9 and 10) mounted in the support 10 prevent excessive separation of the shutters 11, 12.

By means of the present invention, letterpress and reproductions from half-tone blocks may be phototelegraphed to yield a reproduction which is quite suitable for the production of a printing block of greatly improved quality by process engraving methods.

What I claim is:

1. Photo-telegraphy apparatus of the character indicated including a constant intensity light beam, a mask having an aperture therein, an oscillograph, a mirror mounted upon the oscillograph so that the light beam will impinge thereon, the oscillograph controlling the mirror to cause the light beam to sweep over the mask and the aperture therein in accordance with the lightness in the color of the portion of a subject being scanned at any instant, the width of the aperture corresponding to a fraction of the full range of travel of the light beam between its positions of displacement corresponding to transmission of black and transmission of white and the width of the light beam being a multiple of the width of the aperture, whereby all displacements of the light beam for all grey tones of a deeper hue than a selected tone produce the same result as a displacement due to black whereas all other displacements of the beam relative to the aperture produce the same result as a displacement due to white.

2. Photo-telegraphy apparatus of the character indicated including a constant intensity light beam, a mask having an aperture therein, an oscillograph, a mirror mounted upon the oscillograph so that the light beam will impinge thereon, the oscillograph controlling the mirror to cause the light beam to sweep over the mask and the aperture therein in accordance with the lightness in the color of the portion of a subject being scanned at any instant, the width of the aperture being equivalent to one-eighth of the full range of travel of the light beam and the width of the latter being four times the width of the aperture, whereby all displacements of the light beam for all grey tones of a deeper hue than a selected tone produce the same result as a displacement due to black whereas all other displacements of the beam relative to the aperture produce the same result as a displacement due to white.

JOHN WILLIAM SPENCER.

REFERENCES CITED

The following references are of record in the file of this patent:

UNITED STATES PATENTS

| Number | Name | Date |
|---|---|---|
| 2,152,348 | Finch | Mar. 28, 1939 |
| 2,163,539 | Clothier | June 20, 1939 |
| 2,222,991 | Sorkin | Nov. 26, 1940 |
| 2,274,687 | Ives | Mar. 3, 1942 |